(12) United States Patent
Carcagno

(10) Patent No.: US 6,557,906 B1
(45) Date of Patent: May 6, 2003

(54) TUBULAR MEMBERS

(75) Inventor: Gabriel Carcagno, Buenos Aires (AR)

(73) Assignee: Siderca S.A.I.C. (AR)

( * ) Notice: Subject to any disclaimer, the term of this patent is extended or adjusted under 35 U.S.C. 154(b) by 0 days.

(21) Appl. No.: 09/666,141

(22) Filed: Sep. 20, 2000

(30) Foreign Application Priority Data

Sep. 21, 1999 (AR) ................................... P 99 01 04738

(51) Int. Cl.$^7$ ................................................. F16L 25/00
(52) U.S. Cl. ..................... 285/333; 285/334.2; 285/390
(58) Field of Search ............................. 285/333, 334.2, 285/334.4, 390, 334

(56) References Cited

U.S. PATENT DOCUMENTS

| | | | | |
|---|---|---|---|---|
| 4,377,302 A | * | 3/1983 | Kohyama et al. | 285/390 |
| 4,619,472 A | * | 10/1986 | Kozono et al. | 285/333 X |
| 4,629,224 A | * | 12/1986 | Landriault | 285/334 |
| 4,732,416 A | * | 3/1988 | Dearden et al. | 285/333 |
| 4,984,829 A | * | 1/1991 | Saigo et al. | 285/334 |
| 5,007,665 A | * | 4/1991 | Bovisio et al. | 285/333 |
| 5,137,310 A | * | 8/1992 | Noel et al. | 285/333 |
| 5,253,902 A | * | 10/1993 | Petelot et al. | 285/333 X |
| 5,549,336 A | * | 8/1996 | Hori et al. | 285/333 |
| 5,649,725 A | * | 7/1997 | Nagasaku et al. | 285/334.4 |
| 5,769,466 A | * | 6/1998 | Noel et al. | 285/333 |
| 6,045,165 A | * | 4/2000 | Sugino et al. | 285/333 |

\* cited by examiner

*Primary Examiner*—Eric K. Nicholson
*Assistant Examiner*—David E. Bochna
(74) *Attorney, Agent, or Firm*—Fitzpatrick, Cella, Harper & Scinto

(57) ABSTRACT

A threaded union highly resistant to overtorque and compression that includes a threaded member in its internal surface—called female—that joins a threaded member in its external surface—called male—. The union between the male extreme and the female is produced through the threaded surface. When the members are fully assembled, one axially oriented surface in the free extreme of one of the members—called nose—presses against a corresponding surface in the other member—called shoulder of torque. This shoulder is comprised of two surfaces, a first one coincidentally oriented to the corresponding nose of the first member, and a second one truncated and conical in shape with an angle B and with the axis of the pipe located between the first surface and the internal cylindrical surface of the female member. This geometry increases the resistance of same to overtorque action, without having to increment the net contact surface between the annular surface axially directed of the nose and the corresponding surface of the shoulder of the second member.

4 Claims, 3 Drawing Sheets

TUBULAR MEMBERS

BACKGROUND OF THE INVENTION

1. Field of the Invention

The present invention relates to a threaded union highly resistant to overtorque and compression that is used with unions that connect tubular members, particularly not exclusively, this union is used with pipes that transport liquids or pressurized gases such as steam, gas or petroleum, and is used with exploration columns or in the production of gas, or petroleum, or used with pipe lines that conduct liquids or gases.

2. Description of the Related Art

Among the main types of connections used today for the above-mentioned purposes includes one female member having one internal circumferential surface provided with a thread and a male member having one external circumferential surface also provided with a thread that corresponds to the female thread, and where the male member is received into the female member through the screwing process. The free edge of one of the members (generally the male) called nose has an annular surface radially oriented, which is pressed against a corresponding surface of the other member (shoulder of torque). In these types of connections there may or may not exist another surface directed axially in the free extreme of one of the members that functions as a seal when pressing itself against a corresponding surface directed axially on the other member. The annular surfaces radially oriented remain compressed as a result of the assembly of the connection. The maximum torque that the connection is able to absorb is limited by the dimensions and design of the free extreme of the first member and of the shoulder of torque zone. Present time connections have similarities between the dimensions of the radially oriented surface of the free extreme of the male member and the corresponding surface of the female member, as well as between the area of resistance of the nose and the area of resistance of the shoulder. However, when torque is increased to present-time connections during assembly or subsequently during any operation with the assembled column, the combination of tensions produced in the shoulder of torque favor the development of stress that shears the material and provokes rupture of the shoulder, thus creating a weak point or critical zone in the connection because of torsional stress. To improve the performance of the connection with this type of stress, it is a common practice to increase the thickness of the nose and the thickness of the shoulder of torque in a similar manner, thus increasing the overtorque bearing power. However, this also increases the susceptibility of the seal to generate seizing, due to greater rigidity of the nose and consequent increase of contact pressures. In addition, increasing the thickness of the nose requires adjustment of the free extreme of the pipe before threading. This affects the properties of the material and complicates the manufacturing process.

SUMMARY OF THE INVENTION

The primary object of the present invention is to provide an improved pipe connection that eliminates or reduces the disadvantages of the present state of the art mentioned above, such as premature failure of the shoulder of torque, while at the same time, increasing the connection's capability to carry torsional stress.

It is also the purpose of the present invention to provide pipe connections where the contact pressure of the sealing surfaces is maintained limited, thus reducing the risk of seizing being generated.

Another purpose of the invention is to provide a union able to maintain stable the shape of the flow line of the fluid that circulates internally without causing substantial changes.

To accomplish the aforementioned objectives, the pipe connection of the present invention comprises a female member having a circumferential internal surface provided with a thread, and a male member having an external circumferential surface also provided with a thread that corresponds to that of the female member. The male member is received into the female member through the screwing process, whereby the members are coupled. One annular surface generally radially oriented located on the free extreme of one of the members, called nose, makes firm contact with an opposite annular surface generally radially oriented toward the other member and named shoulder of torque. The annular surface radially oriented of the first member is intersected in its minor diameter by the interior surface of the pipe. Alternatively, it intersects an internal cylindrical surface parallel to the axis of the pipe. Alternatively, it intersects a trunco-conical in shape surface which, at the same time, intersects the internal surface of the pipe, while the annular surface radially oriented of the second member intersects on its minor diameter with a trunco-conical shape surface radially oriented forming angle B which is between 5° and 25° with the axis of the pipe. This surface, at the same time, intersects with an internal cylindrical surface parallel to the axis of the pipe. Alternatively it forms an angle of less than 5° with the same.

The shoulder of torque configuration, according to the present invention, allows greater overtorque capability of the union, by increasing the section of resistance of the shoulder torque in the plane where the main shear tensions, responsible for the failure in the mechanism in the conventional unions, are generated. Thus, substantially improving the resistance of this weak zone in the commonly used joints. This improvement in resistance is obtained without increasing the thickness of the nose, and without increasing susceptibility to seizing when the nose has a sealant surface of metal to metal contact.

According to a configuration, the first member corresponds to the male member, with a surface generally radially oriented forming angle A with the perpendicular plane to the axis of the pipe in the male member making contact under pressure with a corresponding surface generally radially oriented and forming angle A with the perpendicular to the axis of the pipe in the female member.

BRIEF DESCRIPTION OF THE DRAWINGS

The invention will be better understood with the attached drawings, in which.

DETAILED DESCRIPTION OF THE ILLUSTRATED EMBODIMENTS

Figure 1:
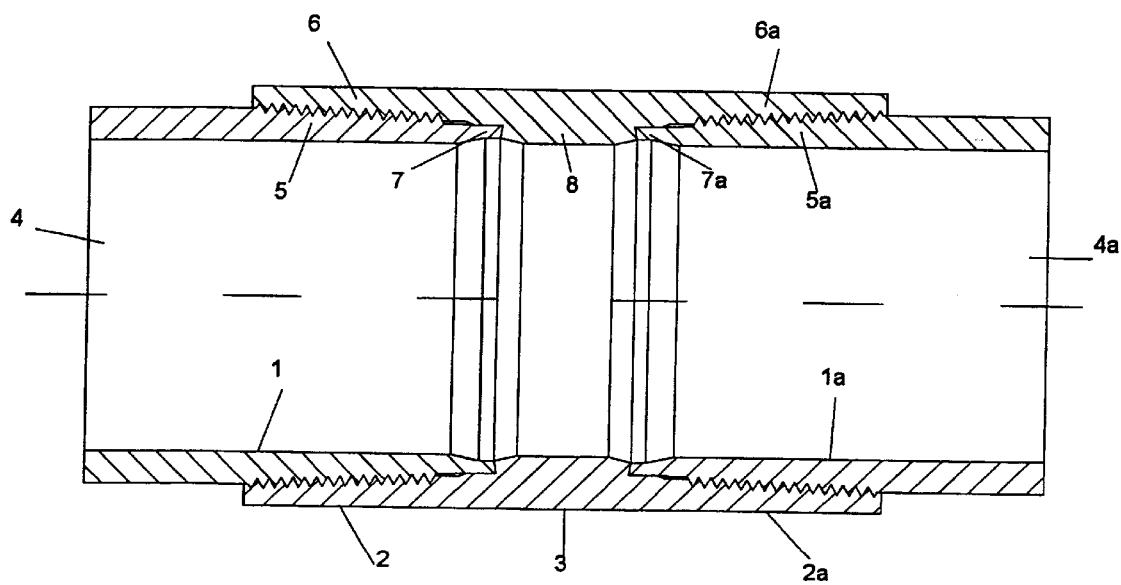
FIG. 1 is a view of an axial section of a connecting configuration according to the present invention.

FIG. 1 shows one connection comprising male member 1 and a female member 2. In this configuration the female member is provided in part with coupling 3 which is also provided with a second female member 2a for connecting with a second mate member 1a. Each one of male members 1 and 1a is provided at the extreme with a pipe section 4, 4a that, as shown, can be integrally attached to the pipe section or can be manufactured separately and welded or fixed in another way.

As is shown in the figure, each male member 1, 1a has an external peripheral surface frustum-conical in shape 5, 5a provided with a thread. Each female member 2, 2a has one corresponding internal peripheral surface frustum-conical in shape 6, 6a also provided with a thread to receive and couple with the corresponding male member. The members can be threaded conventionally. The threads of the peripheral surfaces end near the free extremes 7, 7a of the male members and the corresponding internal ends of surfaces 6, 6a of the female member and, when the members are fully coupled, a surface generally directed radially to the free extreme of each male member 7, 7a (nose) is directed into a sealing butt with a corresponding surface opposed and generally directed radially over shoulder 8 of the female member (shoulder torque), as described in more detail in FIGS. 2 and 3, showing only free extreme 7 of male member 1 and the corresponding portion of shoulder 8 and the internal adjoining surface of female member 2.

Figure 2:
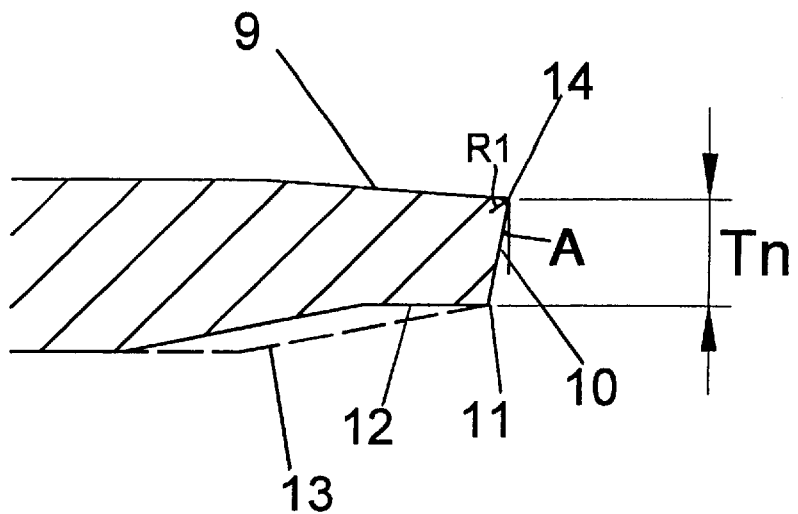
FIGS. 2 and 3 are enlarged views of the axial sections of part of the connection indicated in FIG. 1.

As is shown in FIG. 2, free extreme 7 of male member 1 (called nose) is provided with a first external annular surface 9, axially directed, and a second annular surface 10 radially directed forming angle A with the perpendicular plane to the axis of the pipe. Surface 9 may or may not contain a surface or annular region destined to produce the sealing of the connection when it is in contact with the corresponding surface of the female member. Second surface 10 may end in 11, the latter having a pre-defined diameter in the internal surface of the male member. Alternatively, (it may end) in a third internal cylindrical surface 12, or, alternatively, (it may end) in a frustum-conical shape surface 13 indicated with a dotted line. This surface 13 ends in the internal surface of the male member. Surfaces 9 and 10 are interconnected through annular surface 14 which has a curvature radius of R1. As a characteristic of this male member called nose, is the definition Tn or thickness of nose which is the distance between the virtual intersection of surfaces 9 and 10 with point 11 termination of surface 10, measured over a perpendicular plane to the axis of the pipe.

Figure 3:
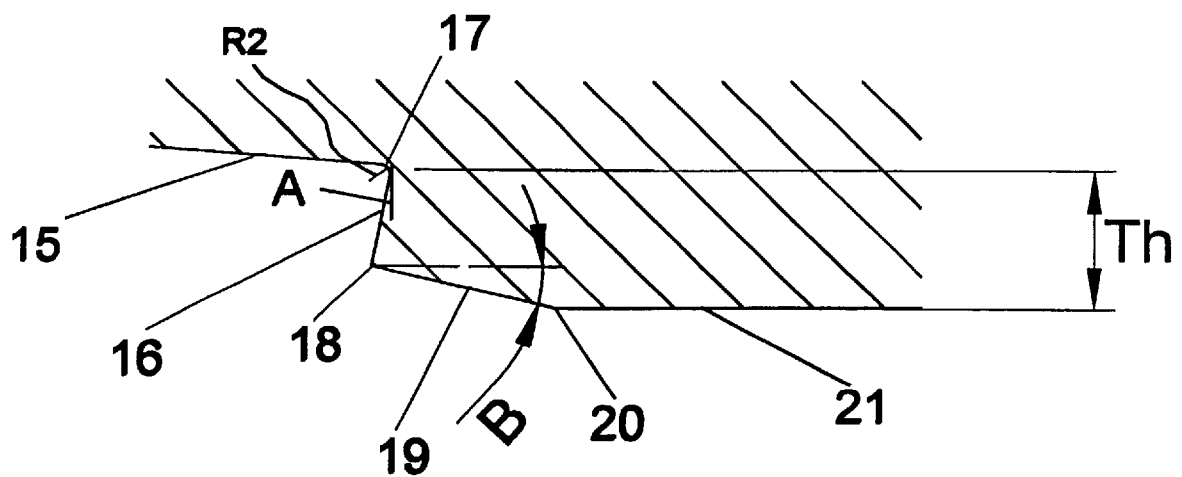

As is shown in FIG. 3, female member 2 is provided with surfaces 15 and 16 which correspond to surfaces 9 and 10 of the male member, interconnected through annular surface 17 that has a curvature radius of R2, which radius, for assembly reasons should be greater than R1. Surface 16 joins in 18 with trunco-conical-cone surface 19, forming angle B with the axis of the pipe with a value of between 5° and 25°. Surface 19 is joined at the same time at point 20 with internal cylindrical surface 21. Alternatively, surface 21 may form an angle of less than 5° with the axis of the pipe. The section of the female member comprised by surfaces 16, 19, and 21 constitute the "shoulder of torque" that must support the compressive loads resulting from torque action during assembly or operation. Th or "shoulder thickness" is defined as the distance between the virtual intersection of surfaces 15 and 16 and point 20 where surfaces 19 and 21 are intersected. Where surfaces 16 and 19, meet, point 18, a bevel edge or a radius of agreement could alternatively be included.

As a condition of the present invention, the following relation could be established between the thickness of nose, Tn, and the thickness of the shoulder, Th:

$$1.1 \leq \frac{Th}{Tn} \leq 1.4$$

For an angle value of surface 19 established by the present invention of:

$5° \leq B \leq 25°$

Figure 4:
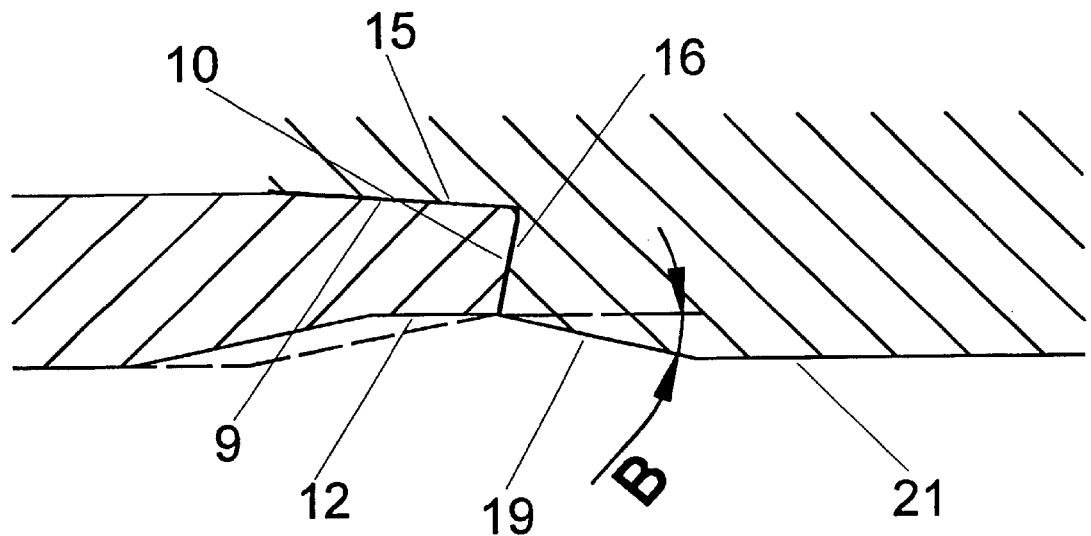
FIG. 4 shows parts shown in FIGS. 2 and 3 when the connection is assembled.

FIG. 4 shows in detail the free extreme of the male member described in FIG. 2 when it finds itself in the final position of assembly with the female member described in FIG. 3. Corresponding surfaces 10 and 16 are in firm contact under compression loads. Surfaces 9 and 15 may or may not be in contact, depending on whether the connection has any type of metal to metal seal. When the pressure between surfaces 10 and 16 is increased due to greater stress because of increased torque action or due to compressive loads in the union, the region defined by surfaces 16, 19 and 21, called shoulder of torque, will absorb the generated tensions with greater capacity than that absorbed by conventional unions.

Additionally, surfaces 12, 19, and 21 provide a soft transition to the flow of liquid or gas in the interior of the pipe.

Figure 5:
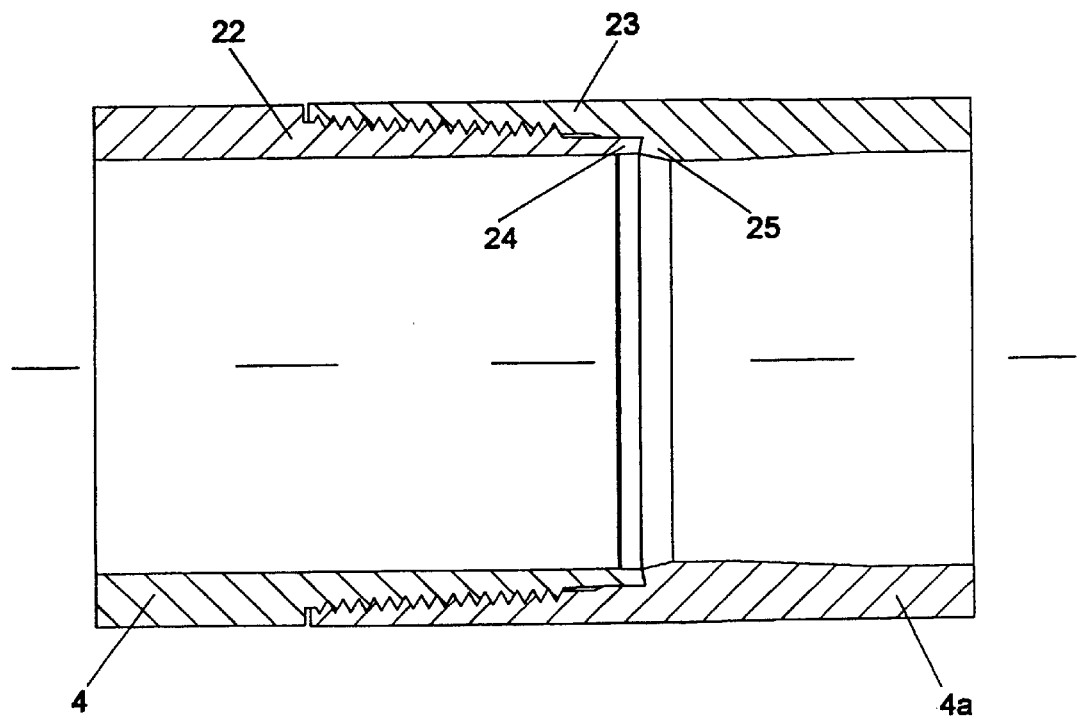
FIG. 5 shows an axial view section of another possible configuration of the present invention.

While the present invention has been described in the context of a connection in which the female member is provided by a coupling, it is equally applicable to a connection of bell and spigot, as shown in FIG. 5, where male and female members 22 and 23 are integrally conformed with the extremes of pin sections 4, 4a, with a surface generally radially oriented as the one described in FIG. 2 in free border 24 of the male member making contact with a surface generally radially oriented and that corresponds to the anterior one, as the one described in FIG. 3, provided in shoulder of torque 25 with female member 23.

What is claimed is:

1. A threaded union for pipes, that is highly resistant to overtorque and compression, comprising:

a female member having an internal circumferential surface and an internal thread, and a male member having an external circumferential surface corresponding to the internal circumferential surface of the female member and to be received into the female member, the male member having an external thread for assembly with the internal thread of the female member;

one of the male and female members having a generally radially oriented annular end surface, and the other of the male and female members having a generally radially oriented annular end surface, the respective end surfaces having inner and outer diameters and complement and contact each other in a final assembly position to transmit forces of torque and applied compression to the connection;

the generally radially oriented annular end surface of the female member being intersected at its inner diameter by a frusto-conical surface that forms angle B with the axis of the threaded union, the frusto-conical surface, in turn, being intersected by a cylindrical surface parallel to the axis of the threaded union, and the annular, frusto-conical, and cylindrical surfaces of the female member being part of a shoulder of torque, and having a combination of angles of inclination and dimensions to accomplish the following:

$1.1 \leq Th/Tn \leq 1.4$ $5° \leq B \leq 25°$ where Th is the thickness of the shoulder measured between the outer diameter of the generally radially oriented annular end surface of the female member and the point of intersection of the frusto-conical surface with the cylindrical surface parallel to the axis of the threaded union, and where Tn is the thickness of the generally radially oriented annular end surface on the male member measured between the outer diameter of the generally radially oriented annular end surface on the male member and the intersection of that surface and the inner diameter thereof.

2. A threaded union, according to claim 1, wherein the end of the male member has a surface or combination of surfaces axially oriented on its exterior for making firm contact with a surface or system of corresponding surfaces in the female member, for providing a seal in the connection.

3. A threaded union according to claim 1, wherein the female member is provided with two opposed female couplings and the male member is provided in one end of the female member.

4. A threaded union according to claim 1, wherein the female member is integrally formed on one end of a pipe and the male member is integrally formed on the other end of the pipe.

* * * * *